United States Patent
Treskunov et al.

(10) Patent No.: US 10,175,874 B2
(45) Date of Patent: Jan. 8, 2019

(54) DISPLAY SYSTEM WITH CONCURRENT MULTI-MODE CONTROL MECHANISM AND METHOD OF OPERATION THEREOF

(71) Applicant: Samsung Electronics Co., Ltd., Gyeonggi-Do (KR)

(72) Inventors: Anton Treskunov, Santa Clara, CA (US); Yuchang Hu, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 13/914,268

(22) Filed: Jun. 10, 2013

(65) Prior Publication Data
US 2014/0191984 A1 Jul. 10, 2014

Related U.S. Application Data

(60) Provisional application No. 61/749,246, filed on Jan. 4, 2013.

(51) Int. Cl.
*G06F 3/041* (2006.01)
*G06F 3/0488* (2013.01)
*G06F 3/01* (2006.01)
*G06F 3/033* (2013.01)
*H04N 5/445* (2011.01)

(52) U.S. Cl.
CPC ............ *G06F 3/0488* (2013.01); *G06F 3/017* (2013.01); *G06F 3/033* (2013.01); *G06F 3/0416* (2013.01); *G06F 3/04883* (2013.01); *H04N 5/44543* (2013.01); *G06F 2203/0383* (2013.01)

(58) Field of Classification Search
CPC ........ G06F 3/041; G06F 3/038; G06F 3/0416; G06F 3/0426; G06F 3/0481; G06F 3/04812; G06F 3/04892; G06F 3/0412; G06F 3/0418; G06F 3/0425; G06F 3/048; G06F 3/04817; G06F 3/0484; G06F 3/04886; G06F 3/06; G09G 5/00
USPC ............ 345/173, 174, 156; 3/173, 174, 156
See application file for complete search history.

(56) References Cited

U.S. PATENT DOCUMENTS

| 5,956,019 | A | 9/1999 | Bang et al. | |
|---|---|---|---|---|
| 2005/0052425 | A1* | 3/2005 | Zadesky et al. | ............... 345/173 |
| 2005/0162406 | A1* | 7/2005 | Ono | ...................... G06F 3/0488 345/173 |
| 2009/0109183 | A1 | 4/2009 | Carvajal et al. | |

(Continued)

FOREIGN PATENT DOCUMENTS

| EP | 1528460 A1 | 5/2005 |
|---|---|---|
| WO | 2008008267 A2 | 1/2008 |

*Primary Examiner* — Temesghen Ghebretinsae
*Assistant Examiner* — Paras D Karki

(57) ABSTRACT

A display system includes: a user interface configured to detect a finger movement for detecting a finger movement on a trackpad; and a control unit, coupled to the user interface, configured to process a control for both a directional mode and a coordinate mode based only on the finger movement for controlling a device. The display system also includes a communication unit configured to receive a control for both a directional mode and a coordinate mode based only on a finger movement; and a control unit, coupled to the communication unit, configured to extract a directional command, a positional command, or a combination thereof from the control for controlling a device.

20 Claims, 5 Drawing Sheets

(56) References Cited

U.S. PATENT DOCUMENTS

| | | | |
|---|---|---|---|
| 2009/0322676 A1* | 12/2009 | Kerr | G06F 3/0346 345/158 |
| 2010/0134432 A1* | 6/2010 | Seo | G06F 3/04817 345/173 |
| 2010/0328238 A1 | 12/2010 | Sugiue | |
| 2011/0163981 A1* | 7/2011 | Ito et al. | 345/173 |
| 2012/0030604 A1 | 2/2012 | Kim et al. | |
| 2012/0113001 A1* | 5/2012 | Yamauchi | G06F 3/038 345/157 |
| 2012/0249461 A1* | 10/2012 | Flanagan et al. | 345/173 |
| 2013/0215049 A1* | 8/2013 | Lee | 345/173 |
| 2013/0265243 A1* | 10/2013 | Law | G06F 1/3262 345/173 |

\* cited by examiner

DISPLAY SYSTEM WITH CONCURRENT MULTI-MODE CONTROL MECHANISM AND METHOD OF OPERATION THEREOF

CROSS-REFERENCE TO RELATED APPLICATION(S)

This application claims the benefit of U.S. Provisional Patent Application Ser. No. 61/749,246 filed Jan. 4, 2013, and the subject matter thereof is incorporated herein by reference thereto.

TECHNICAL FIELD

An embodiment of the present invention relates generally to a display system, and more particularly to a system for control of a display system.

BACKGROUND

Modern consumer and industrial electronics, especially devices such as graphical display systems, televisions, projectors, cellular phones, portable digital assistants, and combination devices, are providing increasing levels of functionality to support modern life. Controls of these devices vary depending not only on the device but also the application running on these devices. Interface and controls of devices often change. This change can occur through market and product evolution or difference in functionality. Research and development in the existing technologies can take a myriad of different directions.

Thus, a need still remains for a display system with concurrent multi-mode control mechanism for seamlessly controlling devices with different interfaces. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a display system, including: a user interface configured to detect a finger movement for detecting a contact on a trackpad; and a control unit, coupled to the user interface, configured to process a control for both a directional mode and a coordinate mode based only on the finger movement for controlling a device.

An embodiment of the present invention provides a display system, including: a communication unit configured to receive a control for both a directional mode and a coordinate mode based only on a finger movement; and a control unit, coupled to the communication unit, configured to extract directional command, a positional command, or a combination thereof from the control for controlling a device.

An embodiment of the present invention provides a method of operation of a display system including: detecting a finger movement for detecting a contact on a trackpad; and processing a control for both a directional mode and a coordinate mode based only on the finger movement for controlling a device.

An embodiment of the present invention provides a method of operation of a display system including: receiving a control for both a directional mode and a coordinate mode based only on a finger movement; and extracting a directional command, a positional command, or a combination thereof from the control for controlling a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

An embodiment of the present invention provides a display system for the first device, the second device, or the third device concurrently supporting both the direction mode for the directional commands and the coordinate mode for the positional commands for the coordinate identification provides ease of use to the end consumer. The support of the directional mode provides support for different systems allowing seamless interoperability between other devices. The concurrent support also allows applications to take advantage of both the directional commands and the positional commands based on what is most efficient and usable for the application and the user.

An embodiment of the present invention provides a display system with a dynamic mechanism to provide both the directional commands and the positional commands for the directional mode and the coordinate mode, respectively, by forming the grid and the cells based on the first touch of the finger movement.

Figure 4:
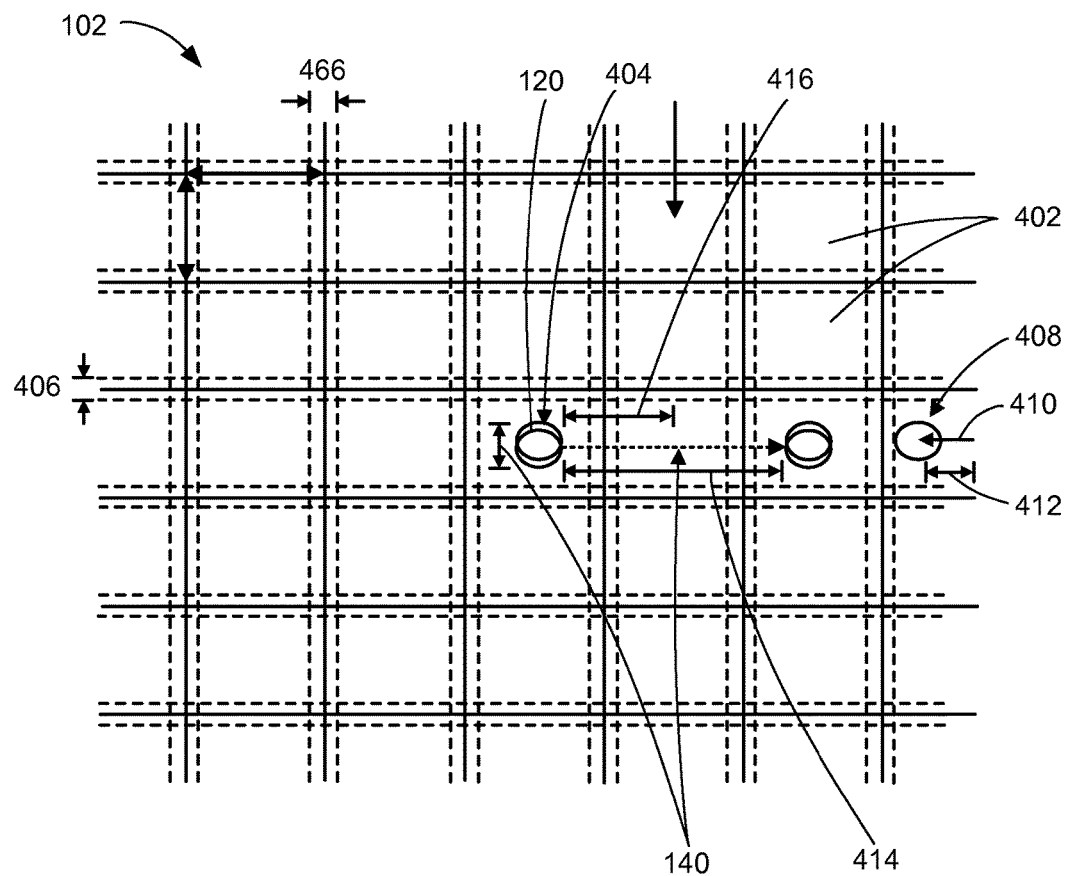
FIG. 4 is an example of the first device providing directional commands.

An embodiment of the present invention provides a display system with a seamless movement of the cursor without vacillation by sizing the buffer zones of FIG. 4 around the each of the cells. The granularity of movements can also be adjusted by sizing the buffer zones to be smaller or larger.

An embodiment of the present invention provides a display system with a conversion of the finger movement to the directional commands or to coordinate commands based on the comparison to the flick threshold or the contact length threshold for both situations where the finger movement is within one of the cells or crosses multiple number of the cells.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
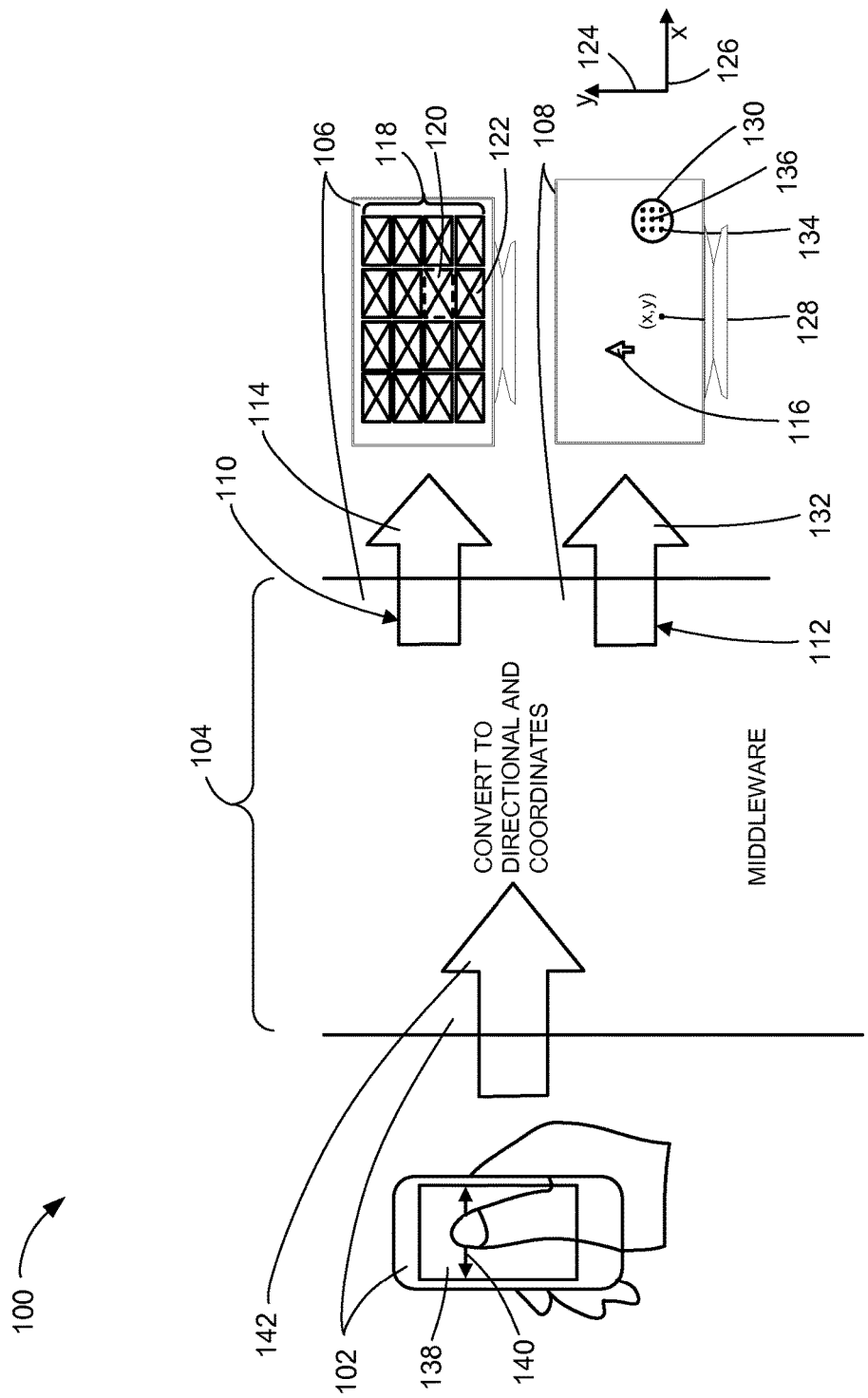
FIG. 1 is a display system with concurrent multi-mode control mechanism in an embodiment of the present invention.

Referring now to FIG. 1, therein is shown a display system 100 with concurrent multi-mode control mechanism in an embodiment of the present invention. The display system 100 can include a first device 102, such as a control device, connected to a second device 106, such as a device having a display, and to a third device 108, such as another device having a display.

The first device 102 can communicate with the second device 106, the third device 108, or a combination thereof with a communication path 104, such as a wireless or wired network. The first device 102 can couple, either directly or indirectly, to the communication path 104 to communicate with the second device 106, the third device 108, or a combination thereof or can be a stand-alone device.

Examples of the first device 102 can include a client device, a remote control, a trackpad-based remote control device, a smartphone, a personal digital assistant (PDA), a computer tablet, or a desktop computer. Examples of the second device 106 can include a television, a tablet, a monitor, a computing device, an entertainment system, or a smartphone. Examples of the third device 108 can also include a television, a tablet, a monitor, a computing device, an entertainment system, or a smartphone.

For illustrative purposes, the second device 106 and the third device 108 are shown both as televisions in FIG. 1, although it is understood that the second device 106 and the third device 108 can be different. For example, the second device 106 and the third device 108 can be different types of devices where one can be a television and another can be a laptop computer having a large display. Also, the second device 106 and the third device 108 can be the same type of devices, such as both being televisions, but can be different types of devices having a display.

In the example shown in FIG. 1, the second device 106 is shown operating in the directional mode 110 and the third device 108 is shown operating in the coordinate mode 112. The second device 106 and the third device 108 can operate in the coordinate mode 112 and directional mode 110, respectively, or support both the coordinate mode 112 and the directional mode 110.

The directional mode 110 is defined as an operational mode based on directional commands 114 for a cursor 116 positioning between actionable items 118. The actionable items 118 are defined as display items depicted on a display of a device that can provide a function beyond merely the movement of the cursor 116. The function can be an active or a non-active function, such as currently not available as can be depicted as a "greyed out" option, as an example. As examples, the actionable items 118 can be a link to a uniform resource locator (URL) for a web operation to that website or a widget icon for executing an application or a function associated with the widget icon. The actionable items 118 can include a current item 120 and a next item 122.

The directional commands 114 are commands to move the cursor 116 from the current item 120 to up, down, left, or right. The current item 120 is one of the actionable items 118 where the cursor 116 is positioned. The up, down, left, or right directions can be a directional vector from the current item 120 to the next item 122, if available, based on the orientation. The next item 122 is one of the actionable items 118 where the cursor 116 can be position from the current item 120 based on the directional commands 114.

As an example, the direction for up can be a top of the second device 106 or the third device 108 where the top is the side of the display opposite a bottom or the side the display nearest a stand of the second device 106 or the third device 108. The direction for down can be the direction 180 degrees from or opposite to the direction for up. A y-axis 124 is defined to include the directions for up and down.

The direction for right can be towards a right-hand side when facing, such as watching the television, the display of the second device 106 or the third device 108. The direction for left can be 180 degrees from or opposite to the direction for right. An x-axis 126 is defined to include the directions for right and left. The directions for up and down can be perpendicular to the directions for right or left.

For illustrative purposes, the directional mode 110 is described as having four directional commands as up, down, right, and left where one command is either 180 degrees opposite another directional command and perpendicular to the other two, although it is understood that the directional mode 110 can provide different directional commands 114 or operate differently. For example, the directional mode 110 can provide different types of the directional commands 114 as diagonal direction, which can be direction vectors between the x-axis 126 and the y-axis 124.

The diagonal direction command can be at 45 degrees from the x-axis 126 or the y-axis 124 or other values not parallel to the x-axis 126 or the y-axis 124 but pre-defined angles. The directional mode 110 can operate differently where the cursor 116 movement based on the directional commands 114 for up, down, left, or right can be positioned to a location that is not parallel to the x-axis 126 or the y-axis 124 from the current item 120. This will be described more in FIG. 2.

The coordinate mode 112 is defined as an operational mode based on a coordinate identification 128 for the cursor 116 positioning between coordinate locations 130. The coordinate mode 112 allows for coordinate-based navigation of the cursor 116. The coordinates are not constrained to the coordinate locations 130 of the actionable items 118 on a display. The cursor 116 can be positioned with positional commands 132 from a current coordinate location 134 to a next coordinate location 136 independent of the current coordinate location 134, the next coordinate location 136, or a combination thereof being on one of the actionable items 118.

As an example, the coordinate mode 112 using the positional commands 132 can use the x-axis 126 and the y-axis 124 to provide a Cartesian coordinate system for the coordinate identification 128 for the coordinate locations 130. The coordinate identification 128 can represent one pixel of the display or an increment for a number of pixels on the display. Each of the coordinate locations 130 can correspond one to one to the coordinate identification 128 or can correspond to some increment of the coordinate identification 128.

Returning to the description of FIG. 1, FIG. 1 depicts a user operating the first device 102 where the first device 102 can be a track-pad based remote control for the second device 106 and the third device 108, both depicted as a display device. The first device 102 can include a trackpad 138. The trackpad 138 provides a contact interface with the first device 102 to control a remote device. The trackpad 138 can detect a finger movement 140 while contacting the trackpad 138. The finger movement 140 is a contact of a finger or an object on the trackpad 138.

The first device 102 can process the finger movement to send controls 142 to the second device 106, the third device 108, or a combination thereof. The controls 142 provide information for operating a remote device. In this example, the remote device is the second device 106 or the third device 108.

The controls 142 can be for the directional mode 110, the coordinate mode 112, or a combination thereof. The controls 142 can be converted to the directional commands 114 for the second device 106 operating in the directional mode 110. The controls 142 can also be converted to the positional commands 132 for the third device 108 operating in a coordinate mode 112.

For illustrative purposes, the first device 102 is described processing the finger movement 140 to generate the controls 142 for the directional mode 110 and the coordinate mode 112, although it is understood that a different device can process the finger movement 140 for the directional mode 110 and the coordinate mode 112. As an example, the controls 142 can provide information about the finger movement 140 to the second device 106, the third device 108, or a combination thereof where the finger movement 140 can be processed to the directional mode 110, the coordinate mode 112, or a combination thereof at the second device 106 or the third device 108.

The controls 142 can be converted to both the directional commands 114 and the positional commands 132 and both can be concurrently sent to the second device 106 and the third device 108. The first device 102, the second device 106, or the third device 108 can perform the conversion of the controls 142 to the directional commands 114 and the positional commands 132.

As an example, the conversion can be done in hardware or some middleware. The conversion is performed without having a separate remote control device (not shown) or a separate control section for each of the modes on the first device 102, the second device 106, or the third device 108. The conversion is performed without having to manually switch between the directional mode 110 and the coordinate mode 112. The conversion is performed without the user knowing that existence of the different modes between the directional mode 110 and the coordinate mode 112 in the first device 102 or what mode is operating in the second device 106 or the third device 108.

As a specific example, the embodiment of the present invention allows a trackpad-based remote control, depicted as the first device 102, to be able to drive both directional command-based (highlighted object) and coordinate-based (the cursor 116) navigation mechanisms seamlessly. The embodiment of the present invention can include from trackpad-based remote control, depicted as the first device 102, transmitting commands or the controls 142 to televisions (TV), depicted as the second device 106 and the third device 108. Where the TV is a display device with graphical user interface (GUI), the GUI can have different forms: grid-like interface, e.g. TV guide or other list of items; or the interface can include from sparse interaction elements, e.g. links in a web page; or other form of interface organization requiring continuous input, e.g. Angry Birds™ game.

There can be an embedded algorithm and software on the remote, depicted as the first device 102, or on a TV, depicted as the second device 106 and the third device 108, that extracts the directional commands 114 from the finger movement 140. The finger movement 140 can also be used to extract the coordinate identification 128 from the positional commands 132. In simplified form, the controls are based on a current finger position on the surface of touch pad. Both the directional commands 114 and the positional commands 132 get transmitted to the TV, where the running application decides which type of commands to use.

An application running on the second device 106 or the third device 108 can rely on the directional commands 114 and maintain compatibility with button based remote controls (not shown). The application can take advantage of the availability of the positional commands 132 and the coordinate identification 128 to enrich user experience. Alternatively, the software layer that extracts the directional commands 114 from the positional commands 132 can be located inside the TV and then transmit the directional commands 114 as well as the positional commands 132 both extracted coming from the remote control to the applications.

It has been discovered that the display system 100 for the first device 102, the second device 106, or the third device 108 concurrently supporting both the directional mode 110 for the directional commands 114 and the coordinate mode 112 for the positional commands 132 for the coordinate identification 128 provides ease of use to the end consumer. The support of the directional mode 110 provides support for different systems allowing seamless interoperability between other devices. The concurrent support also allows applications to take advantage of both the directional commands 114 and the positional commands 132 based on what is most efficient and usable for the application and the user.

For illustrative purposes, the display system 100 is described with the second device 106 and the third device 108 as display devices, although it is understood that the display system 100 can include different types of devices or different number of devices. For example, the first device 102 can also be a device for presenting images or a multi-media presentation. A multi-media presentation can be a presentation including sound, a sequence of streaming images or a video feed, or a combination thereof.

For illustrative purposes, the display system 100 is shown with the first device 102, the second device 106, and the third device 108 as end points of the communication path 104, although it is understood that the display system 100 can have a different partition between the first device 102, the second device 106, the third device 108, and the communication path 104. For example, the first device 102, the second device 106, the third device 108, or a combination thereof can also function as part of the communication path 104.

Also for illustrative purposes, the communication path 104 is shown as a wireless communication between the first device 102 with the second device 106 and the third device 108, although it is understood that the communication path 104 can span and represent a variety of networks. For example, the communication path 104 can include wireless communication, wired communication, optical, ultrasonic, or the combination thereof. Satellite communication, cellular communication, Bluetooth™, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

The display system 100 has been described with functions/modules or order as an example. The display system 100 can partition the functions/modules differently or order the functions/modules differently. For example, the conversion for the directional mode 110 or the coordinate mode 112 can be distributed between the first device 102 with the second device 106 and the third device 108. Also, the conversion process can be dynamically reallocated to be performed by the first device 102, the second device 106, or the third device 108, or a combination thereof depending on the constraints of each of the devices as well as the requirements of the overall system requirements of the display system 100.

The physical transformation from operation of the display system 100 to concurrently and seamlessly operate both the directional mode 110 and the coordinate mode 112 results in the movement in the physical world, such as applications running in the display system 100 operating correctly or even operating at all including providing location information to help move the user of the display system 100 from one location to another. Movement in the physical world results in changes to the type of devices or applications that interacts and operates with the directional mode 110 or the coordinate mode 112 by having different types of devices used or application running in the display system 100.

Figure 2:
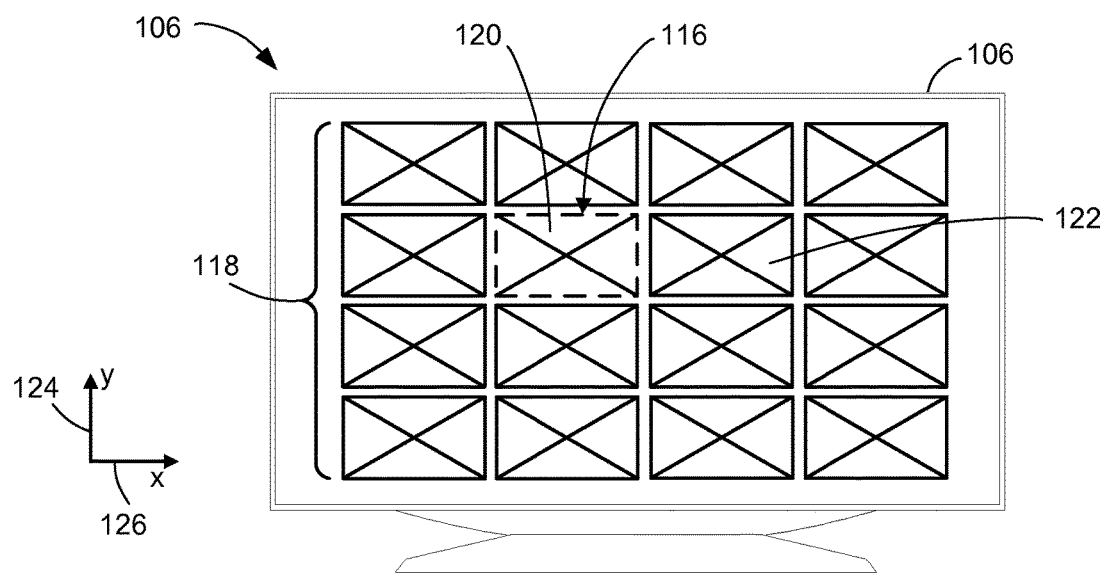
FIG. 2 is a detailed view of an example display of the second device in the directional mode.

Referring now to FIG. 2, therein is shown a detailed view of an example display of the second device 106 in the directional mode 110 of FIG. 1. In this example, the actionable items 118 are shown in a grid configuration on the display of the second device 106.

One of the actionable items 118 is depicted as highlighted current item 120 where the cursor 116 is currently positioned. The directional commands 114 of FIG. 1 can be used to move the position of the cursor 116 from the current item 120 to the next item 122. The directional mode 110 restricts the position of the cursor 116 to highlight and move to one of the actionable items 118 and not between the actionable items 118. In other words, the position of the cursor 116 cannot highlight a portion of the display of the second device 106 between the actionable items 118.

For illustrative purposes, the second device 106 is shown with the actionable items 118 in a uniform grid array configuration where the dimensions of each of the actionable items 118 are same or similar to the others. Although it is understood that the actionable items 118 displayed on the second device 106 can be different from one another. For example, the actionable items 118 can vary in types, height, width, and functions as well as located in a configuration other than a uniform grid.

As an example, the actionable items 118 can be arranged in a non-grid configuration based on the design and needs of the application running on the second device 106. The actionable items 118 can be offset, horizontally as well as vertically, from one another on the display of the second device 106. In this example, the directional commands 114 of up, down, left, and right does not necessarily move the cursor 116 in a vector, or highlight the next item 122 that parallels the x-axis 126 or the y-axis 124 from the current item 120. The next item 122 can have a portion of the icon or graphical representation for the next item 122 overlapping the dimensions to the current item 120 paralleling the x-axis 126 or the y-axis 124. The next item 122 can be the next closest of the actionable items 118 to the current item 120 along the movement vector for up, down, left, or right. The next closest can be measured by a distance metric as being the least distance away from the current item 120 generally along the selection motion vector per the directional commands 114.

Figure 3:
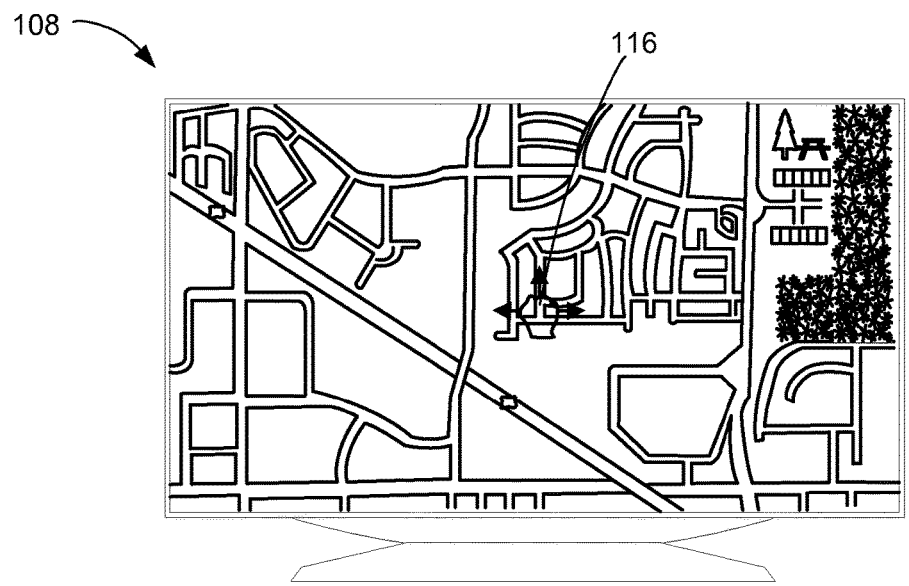
FIG. 3 is a detailed view of an example display of the third device in the coordinate mode.

Referring now to FIG. 3, therein is shown a detailed view of an example display of the third device 108 in the coordinate mode 112 of FIG. 1. In this example, the third device 108 is depicted as showing a map. The map can depict highways, streets, and points of interest, such as stores or parks.

The cursor 116 can be positioned to the coordinate identification 128 of FIG. 1 over one of the points of interest. The points of interest can be an actionable item because the points of interest can provide information about that location or can provide other functions associated with the points of interest. The cursor 116 can also be positioned to the coordinate identification 128 or to the coordinate locations 130 over a non-actionable portion of the map.

An example of a non-actionable portion of the map can be the coordinate locations 130 of FIG. 1 between the streets where the map does not provide any information except perhaps the physical coordinate of the coordinate identification 128. An example of the physical coordinate is a global positioning system (GPS) longitude and latitude information.

Referring now to FIG. 4, therein is shown an example of the first device 102 providing the directional commands 114 of FIG. 1. As an example, the display system 100 or a more specific example the first device 102 can extract the directional commands 114 from the finger movement 140 as follows.

Once a user place a finger on the trackpad 138 of FIG. 1 of the first device 102, the first device 102 can create uniform grid of cells 402 and the grid is centered around a first touch 404 and the cursor 116. The cursor 116 can be initially located at a cell center of one of the cells 402 where the first touch 404 is detected. The size and granularity of the cells 402 can be infinite or more specifically the size of each of the cells 402 and the number of the cells 402 are only limited by the hardware for touch and movement sensitivity of the finger as well as hardware capability, such as processing power with the first device 102, the second device 106, the third device 108, or a combination thereof.

To avoid switching back and forth when the cursor 116 is in between the cells 402, the cells 402 can be disjointed, so there can be buffer zones 406 between the cells 402 or along borders of the cells 402. The size of the buffer zones 406 can vary and can be changed. For example, for quick response time, the buffer zones 406 can be very thin so as not to require too much movement by the finger before seeing a movement of the cursor 116. On the other hand, to minimize rapid vacillation of the position of the cursor 116, the size of the buffer zones 406 can be increased in order for the trackpad 138 to be less sensitive to smaller movements.

The cursor 116 largely moves along with the finger on the trackpad 138 with following possible exceptions. For example, sharp angle diagonal movements can be suppressed; mapping from the finger movement to movement of the cursor 116 depends on speed, accelerating movement of the cursor 116 for fast finger moves.

To support different interaction patterns that different people tend to use (e.g. flick vs track), the display system 100 uses slightly inconsistent behavior model. First, even if the finger movement 140 is not enough to move the cursor 116 into next cell, but quick enough, then this movement still causes the directional commands 114, implementing a flick gesture 408. Also to accommodate people who tend to use short gestures and novices with limited trackpad experience, for the first several position updates, an acceleration 410 of the finger movement 140 can be suppressed.

For example, the quick movement for the flick gesture 408 can be determined based on the acceleration 410 of the finger movement 140 above a flick threshold 412 where if the acceleration 410 meets or exceeds the flick threshold 412, then the finger movement 140 still causes the directional commands 114. If the acceleration 410 is below the flick threshold 412, then the finger movement 140 does not cause the directional commands 114.

As a further example, the flick threshold 412 does not need to be used or be met to cause the directional commands 114. The acceleration time or a movement time prior to the finger lifting off the trackpad 138 can cause the directional commands 114 to be issued. If a movement or a contact length 414 meets or is above a contact length threshold 416, then the directional commands 114 can be issued regardless of the magnitude of the acceleration or if there remained an acceleration of the finger movement 140 before lifting the finger off the trackpad 138. If the contact length 414 is less than the contact length threshold 416, then the directional commands 114 is not issued.

For illustrative purposes, the grid shown in FIG. 4 is shown as a uniform grid where the cells 402 are the same size to each other and the buffer zones 406 are the same size to each other, although it is understood that the grid configuration can be different. For example, the size of the cells 402 can vary depending on the application where a portion of the cells 402 can be smaller than other portions in the grid to accommodate for different sensitivity to the finger movement 140 based on the size of the cells 402 and the buffer zones 406 as described above. A further example can be the buffer zones 406 can be different on the trackpad 138 while the cells 402 can be all the same size to accommodate responsiveness based on applications being controlled on the second device 106.

Figure 5:
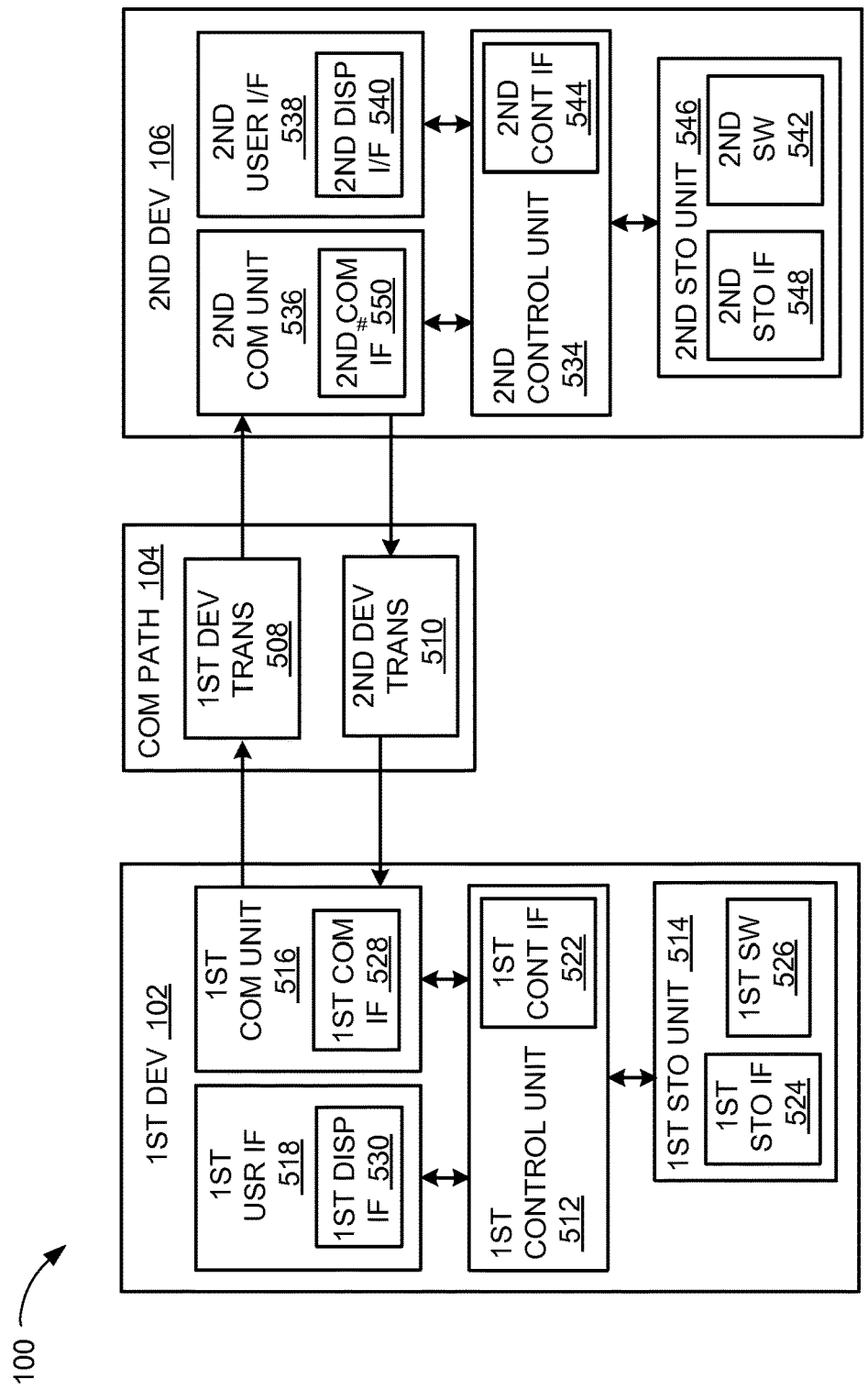
FIG. 5 is an exemplary block diagram of the display system.

Referring now to FIG. 5, therein is shown an exemplary block diagram of the display system 100. The display system 100 can include the first device 102, the communication path 104, the second device 106, and the third device 108 of FIG. 1. The first device 102 can send information in a first device transmission 508 over the communication path 104 to the second device 106 and the third device 108. The controls 142 of FIG. 1 can be sent with the first device transmission 508. The second device 106 can send information in a second device transmission 510 over the communication path 104 to the first device 102.

For brevity and clarity, the exemplary block diagram for the third device 108 is not shown or discussed in detail in this figure. It should be understood that the third device 108 includes the same or similar block diagram as the second device 106 and communicates with the first device 102 over the communication path 104 and with its own device transmission or with the first device transmission 508, the second device transmission 510, or a combination thereof.

For brevity of description in this embodiment of the present invention, the first device 102 will be described as a control device and the second device 106 will be described as a display device. The embodiment of the present invention is not limited to this selection for the type of devices. The selection is an example of an embodiment of the present invention.

The first device 102 can include a first control unit 512, a first storage unit 514, a first communication unit 516, and a first user interface 518. The first control unit 512 can include a first control interface 522. The first control unit 512 can execute a first software 526 to provide the intelligence of the display system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage unit 514 can store the first software 526. The first storage unit 514 can also store the relevant information, such as data representing incoming images, data representing previously presented image, sound files, or a combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include the trackpad 138 of FIG. 1, a keypad, a touchpad, soft-keys, a keyboard, a microphone, an infrared sensor for receiving remote signals, or any combination thereof to provide data and communication inputs. As an example, the trackpad 138 can also be a touchpad.

The first user interface 518 can include a first display interface 530. The first display interface 530 can include a display, a projector, a video screen, a speaker, or any combination thereof.

The first control unit 512 can operate the first user interface 518 to display information generated by the display system 100. The first control unit 512 can also execute the first software 526 for the other functions of the display system 100. The first control unit 512 can further execute the first software 526 for interaction with the communication path 104 via the first communication unit 516.

The second device 106 can be optimized for implementing an embodiment of the present invention in a multiple device embodiment with the first device 102. The second device 106 can provide the additional or higher performance processing power compared to the first device 102. The second device 106 can include a second control unit 534, a second communication unit 536, and a second user interface 538.

The first control unit 512, the second control unit 534, or a combination thereof can detect the finger movement 140 of FIG. 1 and can process or convert the finger movement 140 for generating the controls 142 of FIG. 1 for the directional mode 110 of FIG. 1, the coordinate mode 112 of FIG. 1, or a combination thereof.

The first control unit 512, the second control unit 534, or a combination thereof can also extract the directional commands 114 of FIG. 1, the positional commands 132 of FIG. 1 or a combination thereof from the controls 142. The first control unit 512, the second control unit 534, or a combination thereof can also calculate or extract the coordinate identification 128 of FIG. 1, the coordinate locations 130 of FIG. 1, or a combination thereof.

The first control unit 512, the second control unit 534, or a combination thereof can generate the grid and the cells 402 of FIG. 4 based on the first touch 404 of FIG. 4. The first control unit 512, the second control unit 534, or a combination thereof can generate the buffer zones 406 of FIG. 4 and compute the contact length 414 of FIG. 4. The first control unit 512, the second control unit 534, or a combination thereof can compare the finger movement 140 relative to the flick threshold 412 of FIG. 4, the contact length threshold 416 of FIG. 4, or a combination thereof.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the display system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the display system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the such as data representing incoming images, data representing previously presented image, sound files, or a combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the display system 100 is shown with the second storage unit 546 as a single hierarchy storage system, although it is understood that the display system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The display system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

For illustrative purposes, the display system 100 is described by operation of the first device 102, the second device 106, and the third device 108. It is understood that the first device 102, the second device 106, the third device 108, or a combination thereof can operate any functions of the middleware described above of the display system 100. For example, the middleware can be included in the first software 526, the second software 542, or a combination thereof.

The functions, modules, the middleware, or a combination thereof described in this detailed description can be hardware implementation or hardware accelerators in the first control unit 512 of FIG. 5 or in the second control unit 534 of FIG. 5. The functions, modules, the middleware, or a combination thereof can also be hardware implementation or hardware accelerators within the first device 102 or the second device 106 but outside of the first control unit 512 or the second control unit 534, respectively.

For brevity, FIG. 5 is shown only with the first device 102 and the second device 106. It is understood that the third device 108 of FIG. 1 can also have similar hardware blocks as shown and described for the second device 106. The exemplary block diagram for the second device 106 can be copied in FIG. 5 and the corresponding elements renamed and renumbered for the third device 108.

Figure 6:
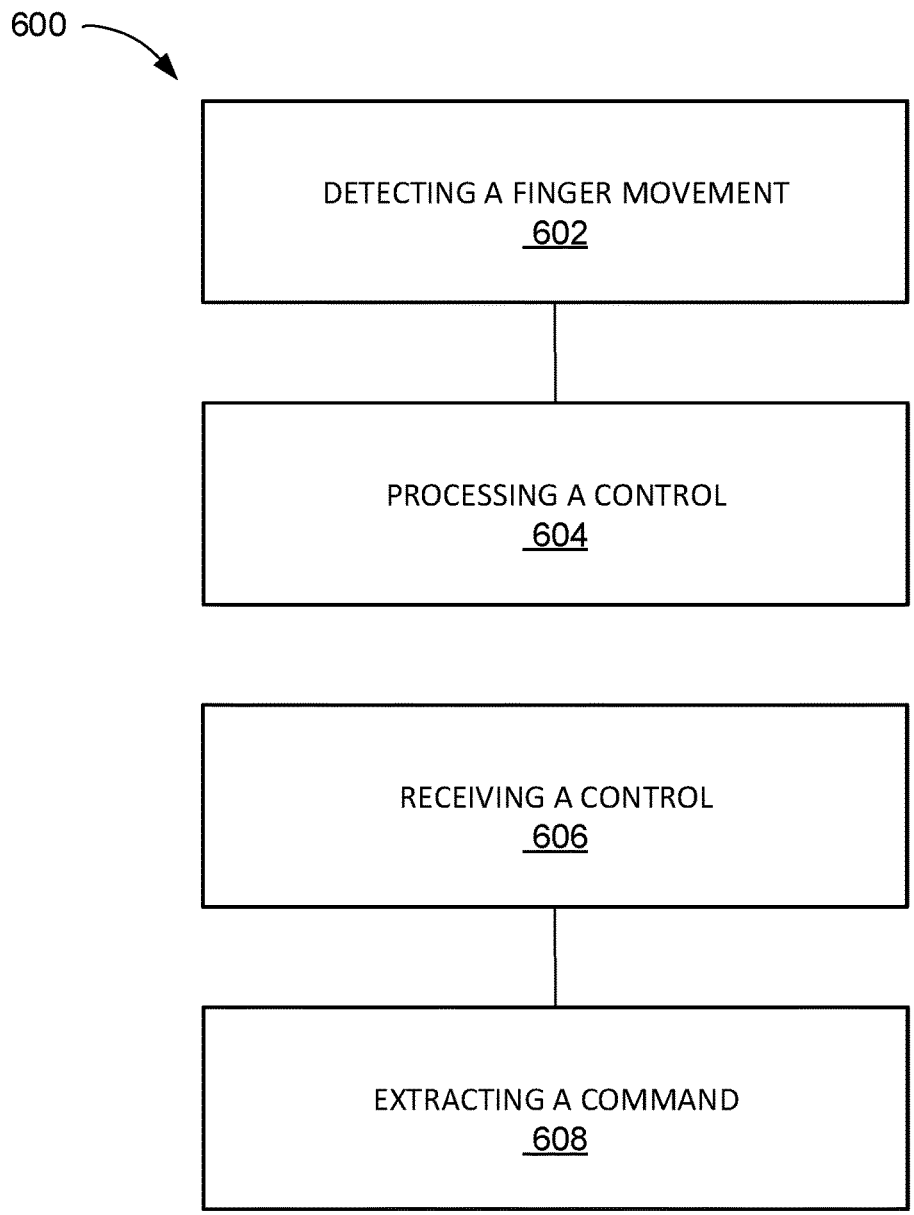
FIG. 6 is a flow chart of a method of operation of a display system in an embodiment of the present invention.

Referring now to FIG. 6, therein is shown a flow chart of a method 600 of operation of a display system 100 in an embodiment of the present invention. The method 600 includes: detecting a finger movement for detecting a contact on a trackpad in a block 602; and processing a control for both a directional mode and a coordinate mode based only on the finger movement for controlling a device in a block 604.

The method 600 also includes: receiving a control for both a directional mode and a coordinate mode based only on a finger movement in a block 606; and extracting a directional command, a positional command, or a combination thereof from the control for controlling a device in a block 608.

It has been discovered that the display system 100 provides a dynamic mechanism to provide both the directional commands 114 of FIG. 1 and the positional commands 132 for the directional mode 110 and the coordinate mode 112, respectively, by forming the grid and the cells 402 of FIG. 4 based on the first touch 404 of FIG. 4 of the finger movement 140 of FIG. 4.

It has been discovered that the display system 100 provides a seamless movement of the cursor 116 of FIG. 1 without vacillation by sizing the buffer zones 406 of FIG. 4 around each of the cells 402 of FIG. 4. The granularity of movements can also be adjusted by sizing the buffer zones 406 to be smaller or larger.

It has been discovered that the display system 100 provides a conversion of the finger movement 140 to the directional commands 114 of FIG. 1 or to the positional commands 132 based on the comparison to the flick threshold 412 of FIG. 4 or the contact length threshold 416 of FIG. 4 for both situations where the finger movement 140 is within one of the cells 402 or crosses multiple number of the cells 402.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A display system comprising:
   a user interface configured to detect a finger movement corresponding to a contact length, an acceleration, or a combination thereof for detecting the finger movement contacting on a trackpad; and
   a control unit, coupled to the user interface, configured to:
      generate a grid of cells, including buffer zones between the cells, on a control device based on finger position on the trackpad, wherein
         the grid of cells is for mapping finger movement to movement of a cursor, and
         a size of the buffer zones is adjusted in response to movement granularity of the cursor corresponding to reduced sensitivity of the finger movement on the trackpad to prevent vacillation of the cursor when the cursor is between two of the cells,
   process a control operating in either a directional mode and a coordinate mode determined based on the contact length, the acceleration, or a combination thereof of the finger movement for controlling a device,
      wherein the directional mode is for moving the cursor in a discrete direction from a current item to a next item simultaneously displayed on a screen with the next item displayed along the discrete direction in relation to the current item, and
      wherein the coordinate mode is for moving the cursor on the screen without constraint to the current item and the next item.

2. The system as claimed in claim 1, wherein the control unit is configured to provide a directional command and a positional command from the control.

3. The system as claimed in claim 1, wherein:
   the user interface is configured to detect a first touch of the finger movement; and
   the control unit is configured to form the grid of cells based on the first touch.

4. The system as claimed in claim 1, wherein the control unit is configured to:
   form the grid of cells based on the finger movement;
   determine a flick gesture with the finger movement within one of the cells; and
   process the control includes to issue a directional command based on the flick gesture meeting or exceeding a flick threshold.

5. The system as claimed in claim 1 wherein the control unit is configured to:
   determine a flick gesture with the finger movement; and
   process the control includes to issue a directional command based on the contact length of the finger movement meeting or exceeding a contact length threshold.

6. The system as claimed in claim 1 wherein the control unit is configured to generate the grid of cells centered around detection of a first touch on the trackpad.

7. A display system comprising:
   a communication unit configured to receive a control operating in either a directional mode and a coordinate mode determined based on a contact length, an acceleration, or a combination thereof of a finger movement; and
   a control unit, coupled to the communication unit, configured to extract a directional command based on detection of the finger movement, on a grid of cells on a control device, representing a position on a trackpad, a positional command, or a combination thereof from the control for controlling a device, wherein:
   the grid of cells is for mapping the finger movement to movement of a cursor and includes buffer zones between the cells and a size of the buffer zones is adjusted in response to a movement granularity of the cursor corresponding to the reduced sensitivity of finger movement on the trackpad to prevent vacillation of the cursor when the cursor is between two of the cells,
   the directional command is for moving the cursor in a discrete direction from a current item to a next item simultaneously displayed on a screen with the next item displayed along the discrete direction in relation to the current item, and the positional command is for moving the cursor on the screen without constraint to the current item and the next item.

8. The system as claimed in claim 7, wherein the control unit is configured to operate on an actionable item including the next item based on the directional command.

9. The system as claimed in claim 7, wherein the control unit is configured to move the cursor to a coordinate location based on the positional command.

10. The system as claimed in claim 7, wherein the control unit is configured to move the cursor to a coordinate location not related to an actionable item based on the positional command.

11. A method of operation of a display system comprising:
detecting a finger movement for detecting the finger movement contacting on a trackpad, the finger movement corresponding to a contact length, an acceleration, or a combination thereof; and
generating a grid of cells, including buffer zones between the cells on a control device, based on finger position on the trackpad, wherein:
the grid of cells is for mapping the finger movement to a movement of a cursor, and size of the buffer zones is adjusted in response to a movement granularity of the cursor corresponding to reduced sensitivity of the finger movement on the trackpad to prevent vacillation of the cursor when the cursor is between two of the cells,
processing a control operating in either a directional mode and a coordinate mode determined based on the contact length, the acceleration, or a combination thereof of the finger movement for controlling a device,
the directional mode is for moving the cursor in a discrete direction from a current item to a next item simultaneously displayed on a screen with the next item displayed along the discrete direction in relation to the current item, and
the coordinate mode is for moving the cursor on the screen without constraint to the current item and the next item.

12. The method as claimed in claim 11, wherein processing the control for both the directional mode and the coordinate mode includes providing a directional command and a positional command, respectively.

13. The method as claimed in claim 11, wherein:
detecting the finger movement includes detecting a first touch, and
the method further comprising:
forming the grid of cells based on the first touch.

14. The method as claimed in claim 11, further comprising:
forming the grid of cells based on the finger movement; and
determining a flick gesture with the finger movement within one of the cells, and
wherein
processing the control for both the directional mode and the coordinate mode includes issuing a directional command based on the flick gesture meeting or exceeding a flick threshold.

15. The method as claimed in claim 11 further comprising:
determining a flick gesture with the finger movement, and
wherein
processing the control for both the directional mode and the coordinate mode includes issuing a directional command based on the contact length of the finger movement meeting or exceeding a contact length threshold.

16. The method as claimed in claim 11 further comprising generating the grid of cells centered around detection of a first touch on the trackpad.

17. A method of operation of a display system comprising:
receiving a control operating in either a directional mode and a coordinate mode determined based on a contact length, an acceleration, or a combination thereof of a finger movement; and
extracting a directional command based on detection of the finger movement, on a grid of cells on a control device, representing a position on a trackpad, a positional command, or a combination thereof from the control for controlling a device, wherein:
the grid of cells is for mapping the finger movement to movement of a cursor, and includes buffer zones between the cells and size of the buffer zones is adjusted in response to movement granularity of the cursor corresponding to reduced sensitivity of the finger movement on the trackpad to prevent vacillation of the cursor when the cursor is between two of the cells,
the directional command is for selecting a next item displayed on a screen simultaneously with a current item located along a discrete direction including up, down, left, or right, and the positional command is for commanding movement of the cursor on the screen without constraint to an actionable item including the current item and the next item.

18. The method as claimed in claim 17, further comprising operating on an actionable item including the next item based on the directional command.

19. The method as claimed in claim 17, further comprising moving the cursor to the coordinate location based on the positional command.

20. The method as claimed in claim 17, further comprising moving the cursor to the coordinate location not related to an actionable item based on the positional command.

* * * * *